3,296,274
SYNTHESIS OF BORON COMPOUNDS
Stanley Frank Stafiej, Springdale, and Dorothy Ann
Carvalho, Bridgeport, Conn., assignors to American
Cyanamid Company, Stamford, Conn., a corporation
of Maine
No Drawing. Filed Mar. 9, 1964, Ser. No. 351,582
6 Claims. (Cl. 260—296)

This invention relates to a novel method for the preparation of boron-containing cations and to the novel boron-containing salts produced thereby. In its broadest aspects, the method of the present invention comprises reacting, under anhydrous conditions, a borohydride salt with at least two equivalents of a trityl salt and at least two equivalents of a nucleophile or ligand. This invention also comprises those products wherein the central boron atom is bonded to two identical ligand moieties (which may be linked to each other).

This reaction may be represented by the following equation:

(I)

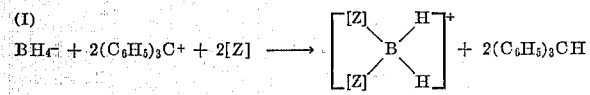

wherein [Z] represents a ligand selected from the group consisting of tertiary amines in which the nitrogen atom is bonded only to carbon atoms of hydrocarbon or substituted hydrocarbon radicals, nitriles, di-alkyl sulfides, and tertiary phosphines in which the phosphorus atom is bonded only to carbon atoms of hydrocarbon or substituted hydrocarbon radicals.

The borohydride salt may have either inorganic or organic cations, such as sodium, potassium, lithium, calcium, barium, zinc, tetramethylammonium, and triphenylmethylphosphonium. Illustrative of borohydride salts useful in the process of this invention are the following: $NaBH_4$, $KBH_4$, $LiBH_4$, $Ca(BH_4)_2$, $Ba(BH_4)_2$, $Zn(BH_4)_2$, $(CH_3)_4NBH_4$, and

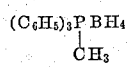

Among the trityl salts (or triphenylmethyl salts) useful for the performance of the present invention are trityl fluoroborate and trityl perchlorate. Since the product cation produced by the process of Equation I is associated with the anion contributed by the trityl salt, the resultant salt can be written as (Ia)

wherein $M^-$ is selected from the group consisting of $BF_4^-$ and $ClO_4^-$ and wherein [Z] has the meaning previously given.

The nucleophile or ligand may be a tertiary amine in which the nitrogen atom is bonded only to carbon atoms of hydrocarbon or substituted hydrocarbon radicals. The tertiary amine may have the formula (II)

wherein $R_1$, $R_2$, and $R_3$ are the same or different hydrocarbon radicals or substituted hydrocarbon radicals. For example, they may be lower alkyl (e.g., methyl, ethyl, n-propyl, isopropyl, butyl, etc.), aryl (e.g., phenyl, biphenyl, naphthyl, etc.), aralkyl (e.g., benzyl, xylyl, etc.), alkaryl (e.g., tolyl, dimethyl-phenyl, ethyl-phenyl, cumenyl, etc.) or substituted forms thereof (e.g., containing one or more halogen, alkoxy, ester, thioether, etc. groups). Also the tertiary amine may have the formula (III)

wherein $R_4$ and $R_5$ are hydrocarbon radicals or substituted hydrocarbon radicals. For example, $R_4$ may be the same as previously described for $R_1$, $R_2$, and $R_3$ and $R_5$ may be a bivalent radical which, when joined to the nitrogen atom by both valences, forms a heterocyclic ring (e.g., pyrrole, pyrrolidine, pyrroline, piperazine, piperidine, pipecoline, etc.). Further, the tertiary amine may have the formula (IV)

wherein $R_6$ is a hydrocarbon radical or substituted hydrocarbon radical which, in conjunction with the nitrogen atom, forms a heterocyclic ring (e.g., pyridine, naphthyridine, quinoline, pyrimidine, bipyridyl, etc.). Additionally, the tertiary amine may be a hydrazine derivative having the formula (V)

wherein $R_7$ and $R_8$ may be the same as $R_1$, $R_2$, or $R_3$ above.

Also, the ligand can be any of the various nitriles, e.g., lower alkylnitriles (acetonitrile, propionitrile, butyronitrile, etc.), cyanogen, lower alkylene dinitriles (malononitrile, succinonitrile, glutaronitrile, etc.). Further, the ligand can be a dialkyl sulfide, e.g., dimethyl sulfide, ethyl methyl sulfide, diethyl sulfide, substituted forms of the foregoing, etc.

Additionally, the ligand can be a tertiary phosphine in which the phosphorus atom is bonded only to carbon atoms of hydrocarbon or substituted hydrocarbon radicals and which may have any of the formulae

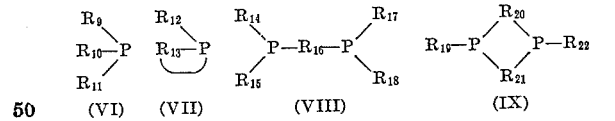

(VI)  (VII)    (VIII)         (IX)

wherein $R_9$, $R_{10}$, $R_{11}$, $R_{12}$, $R_{14}$, $R_{15}$, $R_{17}$, $R_{18}$, $R_{19}$, and $R_{22}$ are monovalent hydrocarbon radicals which may be the same or different in any given formula and $R_{13}$, $R_{16}$, $R_{20}$, and $R_{21}$ and bivalent hydrocarbon radicals. These monovalent hydrocarbon radicals may be any of those previously described for $R_1$, $R_2$, or $R_3$ of Formula II. The bivalent hydrocarbon radical $R_{13}$ can be any one which, when joined to the phosphorus atom by both valences, forms a hetero-cyclic ring (e.g., tetramethylene, pentamethylene, $-CH_2-CH_2-O-CH_2-CH_2-$, $CH_2-CH_2-C_6H_4(1,2)-CH_2-$ etc.). The bivalent hydrocarbon radicals $R_{16}$, $R_{20}$, and $R_{21}$ may be lower bivalent alkyl groups (e.g., methylene, ethylene, propylene, butylene, etc.) and, preferably, $R_{20}$ and $R_{21}$ together with the two phosphorus atoms of Formula IX should add up to a five or six atom heterocyclic ring for maximum stability. $R_{16}$ may also be a bivalent aryl, alkaryl, or aralkyl group (e.g., o-phenylene, m-phenylene, p-phenylene, o-xylylene, m-xylylene, p-xylylene, toluylene, naphthylene, etc.). Illustrative of ligands useful in the process of this invention are the following: $(CH_3)_3N$, $C_6H_5N(CH_3)_2$,

$CH_3C \equiv N$, $N \equiv C—C \equiv N$, $N \equiv C—CH_2—C \equiv N$, $(CH_3)_2S$, $CH_3SC_2H_5$, $(CH_3)_3P$, $C_6H_5P(CH_3)_2$,

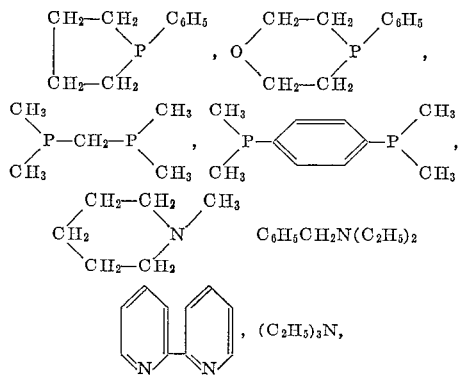

$(CH_3)_2NCH_2CH_2N(CH_3)_2$, etc.

All of the foregoing nucleophiles or ligands have been listed in their simplest forms, but substituted forms thereof may also be used. Thus, they may contain fluorine, chlorine, bromine, or iodine atoms, ester linkages, ether linkages, alkoxy groups, thioether linkages, and other substituents attached thereto provided they do not adversely affect the desired reaction. Also, they may include additional nucleophilic portions providing a plurality of positions to which boron atoms can be secured by ligand linkages. In such case, where a molecule of ligand contains two or more nucleophilic portions, a mole of such ligand is considered to represent two or more equivalents for the purpose of the reaction of the present invention. In such case, the plural nucleophilic portions may link with separate boron atoms or two of such portions may link with the same boron atom to form a heterocyclic boron-containing ring, when such is sterically possible.

It is usually preferred to perform the foregoing reaction in the presence of a solvent, which may be an excess of the nucleophile or ligand used in the reaction. Thus, for example, where the ligand entering into the reaction is acetonitrile, the borohydride salt and the trityl salt may each be dissolved in separate portions of acetonitrile and the two solutions mixed together. Where the ligand is one which is more reactive than acetonitrile for the purposes of the present reaction, the trityl salt and the ligand for the reaction may be dissolved in acetonitrile and this solution added to the borohydride salt. Where the ligand is more reactive than acetonitrile it preferentially will enter into the reaction. Examples of such more highly reactive ligands are pyridine, quinoline, trimethylamine, trimethylphosphine, etc.

It is preferred that the foregoing reactions be performed under anhydrous conditions since the presence of moisture interferes with the proper performance of this reaction and serves to greatly reduce the yields of the desired products. The reaction occurs easily and rapidly at atmospheric pressure and room temperature or below merely upon mixing the various ingredients together. Of course, suitable precautions should be taken in the performance of this reaction to prevent the reaction from getting out of control. Among these precautions might be mentioned, dropwise addition of reagents where necessary to minimize heat build-up; cooling, if necessary, to prevent acceleration of the reaction due to the heat build-up; etc.

While the reaction does occur readily at atmospheric pressure and at or below room temperature, higher or lower pressures and higher or lower temperatures may be used as may be desired. For example, this reaction can be performed at pressures of from about 100 mm. Hg to about 5 atmospheres and at temperatures of from about $-78°$ C. to about $+100°$ C.

The three reactants may be used in stoichiometrical proportions (i.e., two equivalents of trityl salt and two equivalents of ligand for each equivalent of borohydride salt) or an excess (e.g., 0.1 to about 1000 mole percent or more of trityl salt and/or ligand) may be used. Use of excess borohydride salt is to be avoided due to the occurrence of other reactions reducing the yield of desired product.

It will be noted that the foregoing reaction produces a product which has two identical ligands attached to the central boron atom of the cation. Further, in some cases, the two ligands may be linked to each other to form, with the central boron atom, a heterocyclic boron-containing ring. Examples of these products of the present invention are:

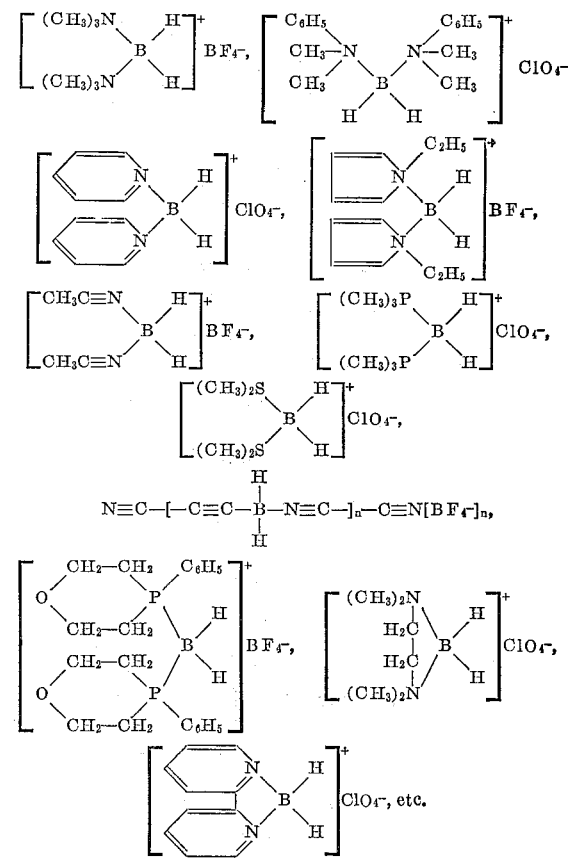

The compounds of this invention are useful as high energy solid rocket propellant ingredients, burning rate modifiers for rocket propellants, and as intermediates for the preparation of other compounds having useful properties, such as by metathesis with compounds having suitable high boron containing anions to yield high boron-containing compounds for use as fuels for rocket propulsion.

Metathetical reactions may be used to convert the salt of Formula 1a to other salts having the characteristic cation of the present invention. Illustrative of such reactions are those which produce the chlorides, bromides, fluorides, nitrates, chlorates, sulfates, chloroplatinates, triiodides, hexafluorometaantimoniates, tetraphenylborates, tetrachloroborates, and fluophosphates of this cation.

For a clearer and more detailed understanding of the nature of the present invention reference may be had to the following examples which are intended as illustrative only and not as limitations on the invention. In the following examples all parts are by weight unless otherwise noted.

*Example 1.—Preparation of—*

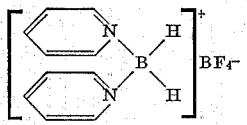

The colorless homogeneous solution, obtained by adding pyridine (1.62 ml.; 0.02 mole) to trityl fluoroborate (6.6 g.; 0.02 mole) dissolved in 50 ml. of dry acetonitrile was added to solid $(CH_3)_4N^+BH_4^-$ (0.89 g.; 0.01 mole) which was cooled to $-55°$ C. As the reaction mixture was allowed to warm to room temperature, gas evolution began. A total of 200 cc. of gas was collected during a 90 min. reaction period. Tetramethylammonium fluoroborate which had precipitated from solution was collected by filtration in 75% yield. The filtrate was evaporated to dryness and extracted with benzene. A quantitative yield of triphenylmethane was recovered from the benzene solution. The benzene-insoluble solid, which was a mixture of the product and $(CH_3)_4N^+BF_4^-$, was recrystallized from methanol-ether to give a 59% yield of $(C_5H_5N)_2BH_2^+BF_4^-$. Further recrystallization from the same solvent pair gave a white crystalline solid (melting point: 95–96° C.) having a density of 1.346 grams per cubic centimeter and a molecular weight (by X-ray diffraction) of 259 and which was soluble in acetonitrile and methanol but insoluble in benzene or diethyl ether.

*Analysis.*—Calc'd for $C_{10}H_{12}N_2B_2F_4$: C, 46.58; H, 4.69; N, 10.87; B, 8.39; F, 29.47. Found: C, 46.42; H, 4.86; N, 10.80; B, 8.73; F, 29.66.

*Example 2.—Preparation of—*

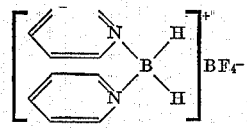

2,2'-bipyridyl (3.12 g.; 0.02 mole) was added to a solution of trityl fluoroborate (6.60 g.; 0.02 mole) in 50 ml. of acetonitrile and a dark red color developed in the solution. This solution was then added dropwise to $(CH_3)_4N^+BH_4^-$ (0.89 g.; 0.01 mole) which was cooled to $-60°$ C. The reaction mixture was warmed up to room temperature during the addition and gas was evolved. After an elasped time of 90 minutes, approximately 200 cc. of gas was collected. No precipitate of $$(CH_3)_4N^+BF_4^-$$

had formed. Consequently, the salmon-pink solution was evaporated to dryness and the residue was extracted with benzene. From the benzene solution, there was obtained an orange viscous liquid, which was not characterized. Four and a half grams of benzene-insoluble material remained which was extracted with methanol to give 2.83 g. of soluble material and 1.53 g. of methanol-insoluble $(CH_3)_4N^+BF_4^-$.

The 2.83 g. of methanol-soluble material was then recrystallized from ethanol-ether. The first two recrystallizations furnished material of M.P. 122–126° which showed BH and BF$_4$ absorption in the infrared. On the third recrystallization, the M.P. increased to 191–192° (180 mg.). An additional recrystallization of this material gave a white crystalline solid (melting point: 191–193° C.) which was soluble in methanol and acetonitrile but insoluble in diethylether.

*Analysis.*—Calc'd for $C_{10}H_{10}N_2B_2F_4$: C, 46.95; H, 3.94; N, 10.95; B, 8.45; F, 29.71. Found: C, 46.97; H, 4.39; N, 11.23; B, 8.53; F, 29.85.

*Example 3*

In the manner of Examples 1 and 2, solutions in dry acetonitrile of 0.02 mole of trityl fluoroborate and 0.02 mole of ligand are reacted with 0.01 mole of borohydride salt as follows:

Trimethylamine with sodium borohydride to produce bis(trimethylamine)-dihydridoboron fluoroborate Diethyl sulfide with lithium borohydride to produce bis(diethyl sulfide)-dihydridoboron fluoroborate Trimethylphosphine with triphenylmethylphosphonium borohydride to produce bis(trimethylphosphine)-dihydridoboron fluoroborate.

We claim:

1. A compound having the formula

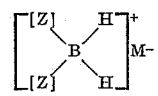

wherein $M^-$ is selected from the group consisting of $BF_4^-$ and $ClO_4^-$ and wherein both [Z]'s are the same ligand selected from the group consisting of tertiary amines in which the nitrogen atom is bonded only to carbon atoms, nitriles, dialkyl sulfides, and tertiary phosphines in which the phosphorus atom is bonded only to carbon atoms.

2.

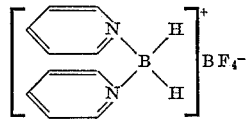

3.

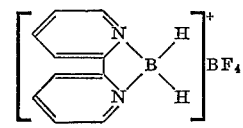

4. A salt of

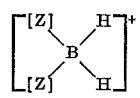

wherein both [Z]'s are the same ligand selected from the group consisting of tertiary amines in which the nitrogen atom is bonded only to carbon atoms, nitriles, dialkyl sulfides, and tertiary phosphines in which the phosphorus atom is bonded only to carbon atoms.

5. A salt of

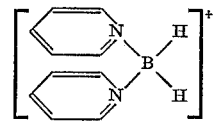

6. A salt of

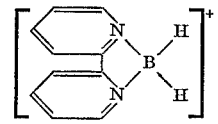

No references cited.

WALTER A. MODANCE, *Primary Examiner.*

ALAN L. ROTMAN, *Assistant Examiner.*